United States Patent [19]

Klenk

[11] Patent Number: 5,299,352
[45] Date of Patent: Apr. 5, 1994

[54] APPARATUS FOR DISMANTLING FILTER INSERTS

[76] Inventor: Manfred Klenk, Rienharzer Strasse 14, D-7077 Alfdorf 2, Fed. Rep. of Germany

[21] Appl. No.: 937,820

[22] Filed: Sep. 2, 1992

[30] Foreign Application Priority Data

Sep. 2, 1991 [DE] Fed. Rep. of Germany ....... 4129464

[51] Int. Cl.$^5$ ............... B23P 19/00; B23Q 41/00; B02C 11/04
[52] U.S. Cl. .................... 29/801; 29/564.3; 83/858; 83/54; 100/97; 100/264
[58] Field of Search ........... 29/403.1, 403.2, 403.3, 29/793, 794, 801, 564.3, 163.8, 426.4; 83/176, 858, 697, 657, 54; 72/326, 331; 100/96, 97, 264, 902, 903

[56] References Cited

U.S. PATENT DOCUMENTS

| 15,341 | 7/1903 | French's | 100/94 |
| 460,774 | 10/1891 | Gibbs | 83/657 |
| 3,826,170 | 7/1974 | Jones et al. | 83/657 |
| 4,800,640 | 1/1989 | Miyazaki et al. | 29/794 X |
| 5,067,398 | 11/1991 | Thoma | 100/264 X |
| 5,182,842 | 2/1993 | Ross et al. | 29/240 X |

FOREIGN PATENT DOCUMENTS 3705391 9/1988 Fed. Rep. of Germany .
3936004 10/1989 Fed. Rep. of Germany .

Primary Examiner—Timothy V. Eley
Assistant Examiner—Khan V. Nguyen
Attorney, Agent, or Firm—Evenson, McKeown, Edwards & Lenahan

[57] ABSTRACT

An apparatus for dismantling filter inserts, especially disposable oil filters which comprise a filter paper element and an internal metal supporting tube, as well as metal end plates. The apparatus has two support rails 15 and 16 with upper edges formed as cutting edges. The support rails are mounted in a frame 11 for displacement transversely toward or away from each other to vary the spacing between them. Vertically above and perpendicular to the direction of displacement of the two support rails is a platen 26 driven by a compressed-air cylinder 24 or the like to move along the perpendicular such that the platen will compress a filter insert 19 placed upon the two support rails and sever the end plates 21 and 22 from the filter paper element 20.

7 Claims, 3 Drawing Sheets

APPARATUS FOR DISMANTLING FILTER INSERTS

BACKGROUND OF THE INVENTION

This invention relates to an apparatus for dismantling filter inserts.

The use of disposable oil filters for filtering motor oil in motor vehicles is generally known. These disposable oil filters consist of a casing which is permanently joined to the bottom by means of a cover. The inlet and outlet openings for the oil to be filtered are provided in this bottom. In the casing there is a filter insert which usually comprises a tube of pleated paper. The casing may also contain a bypass valve or a shut-off valve which prevents the filter from draining empty when the motor is shut off.

After a certain period of use, such a filter must be removed and replaced with a new one. The disposal of such disposable oil filters whole, which generally still contain a certain amount of old oil in their interior, is problematical. Problem-free disposal is therefore possible only if this disposable oil filter is broken down to its individual components, so that they can be reused or disposed of safely.

Published German Patent Application No. DE 3,705,391 discloses an apparatus for the disposal, elimination and processing of used oil filters. In this apparatus individual oil filters are transported by a conveyor system into a defined final position, then delivered to a cutting station, and in a separating apparatus that follows, the filter paper is freed from the holder. This apparatus is said to make it possible to disassemble a relatively large number of oil filters in a short time.

A disadvantage of this apparatus is that it is very costly, and therefore its use appears to be practical only when there is a large number of used oil filters to be disposed of. Due to the use of handling apparatus to correctly position the oil filters, there is also the disadvantage that filters which have been damaged or crushed during removal from the motor vehicle, which is the case with most disposable oil filters, interfere with the progress of the operation and thus cause the apparatus to be shut down.

Another disadvantage of this apparatus is that, although the casing is separated from the filter insert, the filter insert itself is not completely broken down into its individual components. This filter insert consists of a filter paper element, a so-called "paper star," which is sealed at its ends by two end plates and has a metal center tube. To dispose of this filter insert as a whole as "hazardous waste" is uneconomical.

SUMMARY OF THE INVENTION

It is the object of the invention to provide an improved apparatus for dismantling oil filter inserts.

Another object of the invention is to provide an apparatus for dismantling oil filter inserts which completely breaks down the insert into its component parts.

It is also an object of the invention to provide an apparatus for dismantling oil filter inserts which can effectively process damaged or crushed inserts.

A further object of the invention is to provide an apparatus for dismantling oil filter inserts which is economical to manufacture and operate, even when processing only modest numbers of filter inserts.

These and other objects of the invention are achieved by providing an apparatus for dismantling filter inserts which comprise a filter paper element, an internal support tube, and metal end plates, wherein the apparatus comprises a frame; a pair of spaced support rails having upper edges formed as cutting edges; the support rails being movably mounted on the frame for transverse movement toward or away from each other to selectively adjust the spacing between them; a reciprocable platen movable perpendicular to the cutting edges of the support rails; and drive means operatively connected to the platen to selectively move the platen toward or away from the cutting edges of the support rails; whereby when a filter insert is placed on the support rails and the platen is moved toward the cutting edges, the filter paper element is compressed and the end plates are severed from the filter paper element.

An important advantage of the invention is to be seen in the fact that, with relatively simple elements, namely with support rails or anvil rails which simultaneously serve as knives for shearing off the end plates, and a press platen which acts on the filter insert, the end plates and the filter paper element are separated. After the end plates have been sheared off from the filter paper element, the supporting tube can be pushed out of the filter paper element.

Another feature of the invention is the lengthwise mounting of the two support rails for movement in the manner of a tool carriage. This is desirable because filter inserts come in different lengths, and it enables the apparatus to be readily adjusted to dismantle filters of differing lengths. Due to the great number of filter insert variants which exist, a continuous (step-less) adjustment is especially advantageous.

In accordance with a further preferred embodiments of the invention, means are provided for shifting the support rails toward or away from one another by means of a drive unit. Such a drive unit may, for example, comprise a threaded spindle which manually or by means of an appropriate motor shifts the support rails.

Filter inserts of prominent filter manufacturers have standardized lengths. To adjust the support rails to the size of these filter inserts, provision is made in a further preferred embodiment of the invention to apply this standard to graduation marks disposed on the frame, so that the support rails can be preadjusted to fit the size of the filters to be dismantled. Thus the support rails can be adjusted much more quickly to the size of the respective filter insert.

In accordance with a further preferred embodiment of the invention, the cylinder driving the platen is a pneumatic cylinder which can operate on compressed air.

In still another preferred embodiment of the invention, supporting elements in the form of chocks are provided. It is also possible, of course, to configure the support rails with a V-shaped notch in the area where the filter insert is received so as to assure a specific position of the filter insert.

BRIEF DESCRIPTION OF THE DRAWINGS

The invention will be explained in further detail hereinafter with reference to an illustrative preferred embodiment depicted in the accompanying drawings in which.

DETAILED DESCRIPTION OF PREFERRED EMBODIMENTS

Figure 1:
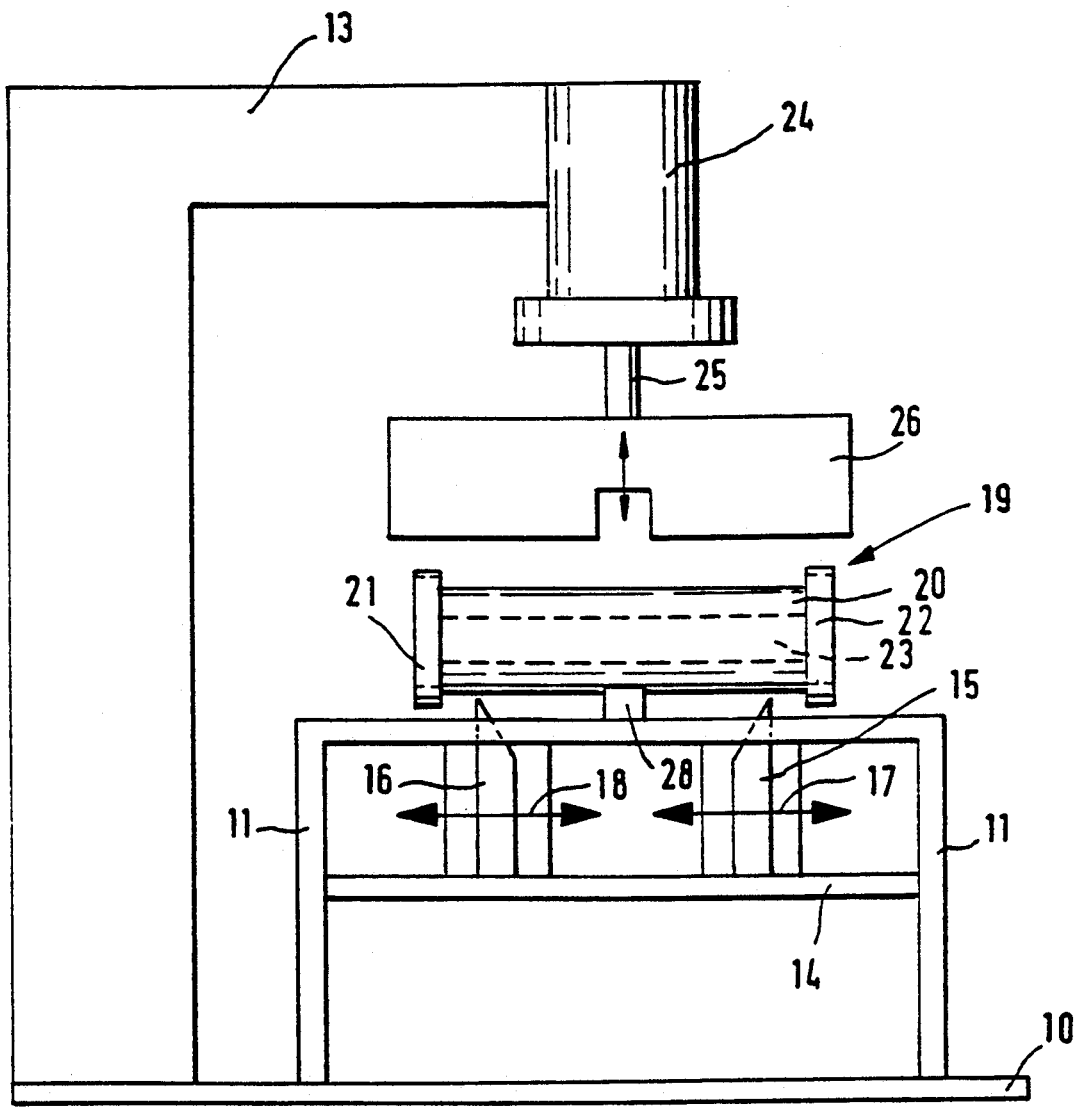
FIG. 1 shows a side elevation of the apparatus of the invention for dismantling filter inserts.

The system shown in FIG. 1 comprises a subframe 10 on which a frame 11 and a beam 13 are disposed. Between the frame members 11 a support 14 is fastened on which two support rails 15, 16 are longitudinally mounted for transverse displacement in the direction of the arrows 17, 18. The support rails 15, 16 have a cutting-edge shape at the top, thereby forming substantially parallel cutting edges.

FIG. 1 also shows a filter insert 19 placed on these cutting edges. This filter insert 19 comprises a filter paper element 20, two end plates 21, 22, and a support tube 23 (shown in broken lines) inside the filter paper element. Above the frame is a pneumatic cylinder 24 having a piston rod 25 on which a platen 26 is mounted. The platen 26 is of sufficient size that it can cover even the longest possible filter inserts.

Pneumatic or hydraulic cylinder 24 drives platen 26 perpendicular to the direction of displacement of the two rails 15, 16. Platen 26 is aligned with the longitudinal cutting edges of support rails 15 and 16 such that when cylinder 24 is actuated to move platen 26 perpendicularly toward the cutting edges, a filter insert 19 resting on the two rails 15, 16 is compressed, and the end plates 21, 22 are severed from the filter paper element 20. Thus, to separate the end plates 21 and 22 from the filter paper element, the platen moves downward and shears off the end plates from the filter paper element resting on the support rails 15 and 16. Then the platen 26 returns to the raised position shown in the drawing. The individual elements of the filter element can be removed, and another filter insert can be placed on the support rails.

For proper operation of the apparatus it is necessary that the support rails 15 and 16 be adjusted to support the filter insert 19 as close as possible to the end plates 21 and 22, so that when the platen 26 is actuated, the ends of the filter inserts will not simply buckle or crimp or kink.

Figure 2:
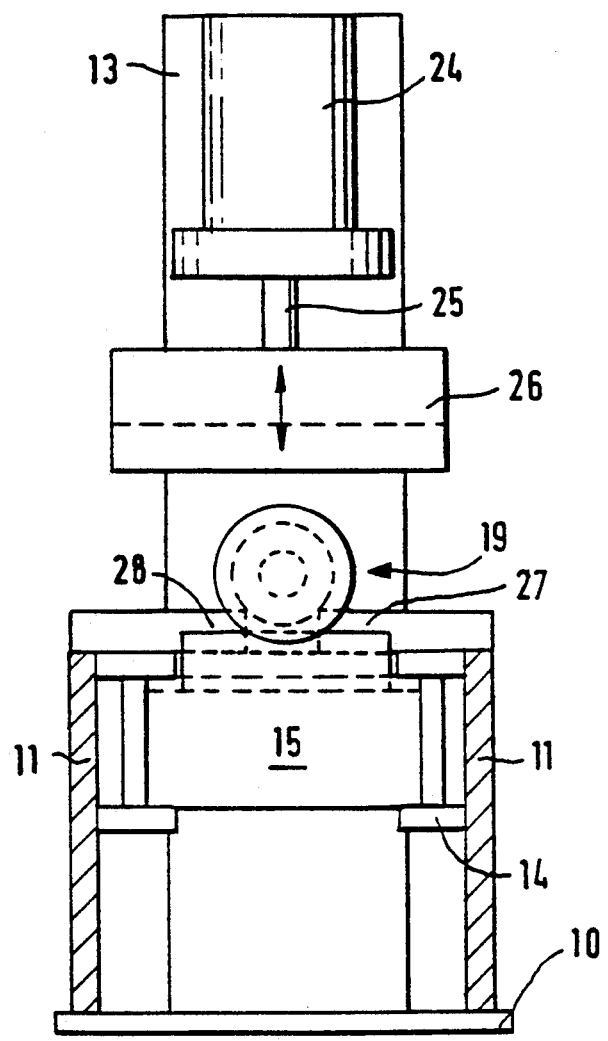
FIG. 2 is a front elevation of the apparatus of FIG. 1.

In FIG. 2 the apparatus of FIG. 1 is represented in a front elevation. Identical elements are provided with the same reference numbers. In this figure it can be seen that chocks 27 and 28 serve to hold the filter insert 19 in a desired position and prevent it from rolling away.

Figure 3:
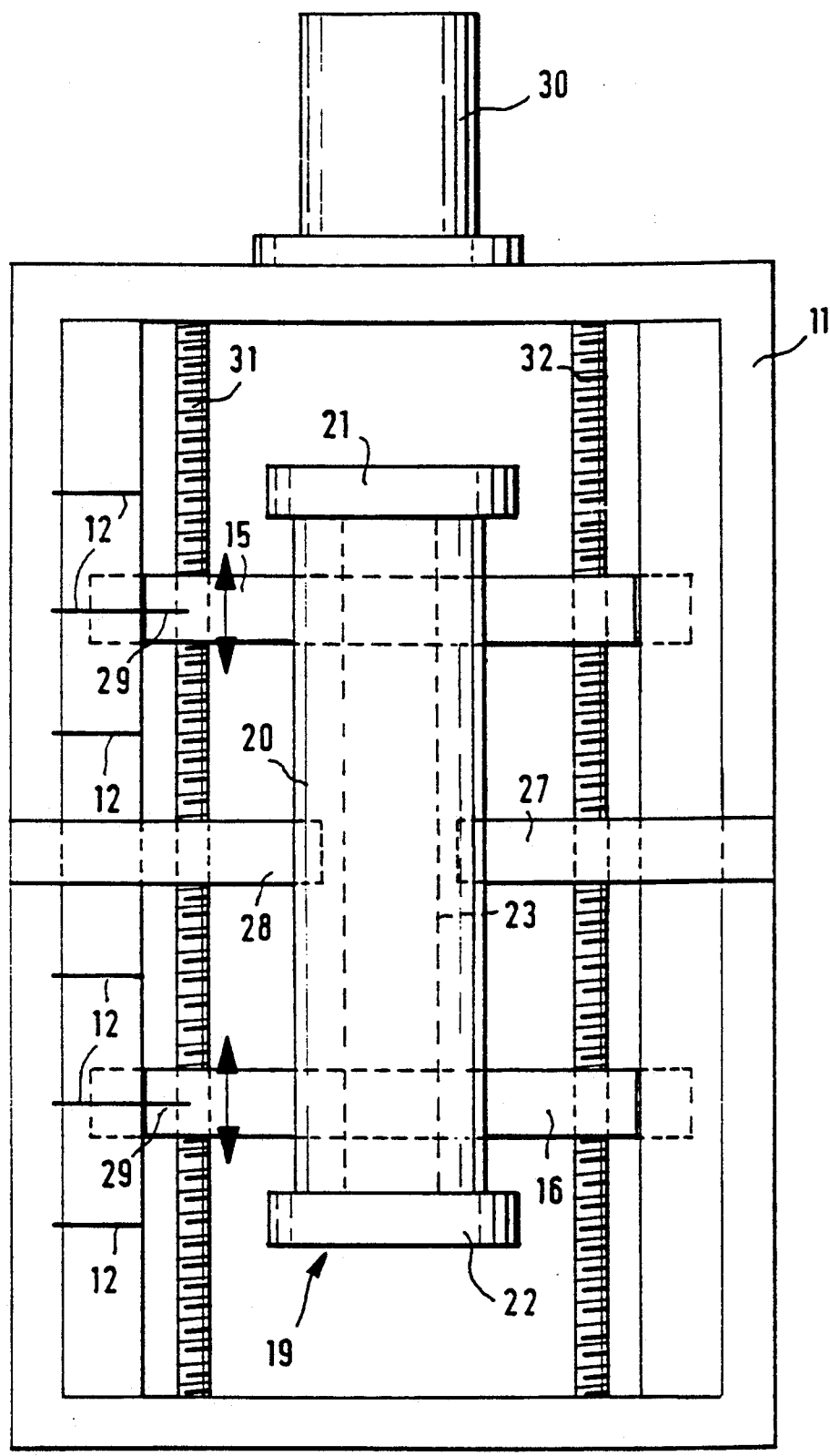
FIG. 3 is a top plan view of a frame with support rails of an apparatus according to FIG. 1.

FIG. 3 shows a top plan view of the frame 11 with the two support rails 15 and 16 and a filter insert 19 placed thereon. Graduation marks 12 are provided on the sides of the frame. The marks 12 cooperate with indicators 29 to indicate when the support rails 15, 16 are at a desired spacing, thereby enabling the support rails to be rapidly adjusted to match the specific size of the filter insert to be dismantled.

FIG. 3 also shows a drive system 30 for the support rails. This drive unit comprises, for example, a pneumatic or electrical drive which turns two threaded spindles 31 and 32 to adjust the spacing of the support rails.

To reduce the bulk volume of the paper element or the metal parts of the filter insert, a simple press can be provided, which compacts the separate parts of the filter insert by means of a hydraulically or pneumatically driven press platen.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. Apparatus for dismantling filter inserts which comprise a filter paper element, an internal support tube, and metal end plates, said apparatus comprising a frame;
   a pair of spaced support rails having upper edges formed as cutting edges; said support rails being movable mounted on said frame for transverse movement toward and away from each other to selectively adjust the spacing between them;
   chock means for holding a filter insert placed on said support rails in a desired position;
   a reciprocable platen movable perpendicular to said cutting edges of said support rails; and
   drive means operatively connected to said platen to selectively move said platen toward and away from the cutting edges of said support rails;
   whereby when a filter insert is placed on said support rails and said platen is moved toward said cutting edges, said filter paper element is compressed and said end plates are severed from said filter paper element.

2. An apparatus according to claim 1, wherein said support tube of said filter is a metal support tube.

3. An apparatus according to claim 1, wherein said end plates are metal end plates.

4. An apparatus according to claim 1, further comprising a drive unit for controllably shifting said support rails transversely toward or away from each other to adjust the spacing between said support rails.

5. An apparatus according to claim 1, wherein said drive means comprise a pneumatic cylinder driven by compressed air.

6. An apparatus according to claim 1, further comprising press means for compacting separated component elements of a dismantled filter insert.

7. An apparatus for dismantling filter inserts which comprise a filter paper element, an internal support tube, and metal end plates, said apparatus comprising
   a frame;
   a pair of spaced support rails having upper edges formed as cutting edges; said support rails being movably mounted on said frame for transverse movement toward and away from each other to selectively adjust the spacing between them;
   a reciprocable platen moveable perpendicular to said cutting edges of said support rails; and
   drive means operatively connected to said platen to selectively move said platen toward or away from the cutting edges of said support rails; whereby when a filter insert is placed on said support rails and said platen is moved toward said cutting edges, said filter paper element is compressed and said end plates are severed from said filter paper element, and wherein graduation marks are provided on said frame which define desired spacings of said support rails for dismantling predetermined size of filter inserts, and pointer elements are provided on said support rails which cooperate with said graduation marks to indicate when said support rails are at a desired spacing.

* * * * *